United States Patent
Bobo et al.

(10) Patent No.: US 9,541,228 B2
(45) Date of Patent: Jan. 10, 2017

(54) PUSH-TO-CONNECT FITTING

(71) Applicant: NIBCO Inc., Elkhart, IN (US)

(72) Inventors: David Bobo, Granger, IN (US); David Phelps, Mishawaka, IN (US); James LaFortune, Elkhart, IN (US); Derek Oldsen, Bristol, IN (US)

(73) Assignee: NIBCO INC., Elkhart, IN (US)

( * ) Notice: Subject to any disclaimer, the term of this patent is extended or adjusted under 35 U.S.C. 154(b) by 115 days.

(21) Appl. No.: 14/564,271

(22) Filed: Dec. 9, 2014

(65) Prior Publication Data

US 2015/0159794 A1    Jun. 11, 2015

Related U.S. Application Data

(60) Provisional application No. 61/914,522, filed on Dec. 11, 2013.

(51) Int. Cl.
*F16L 39/00* (2006.01)
*F16L 37/091* (2006.01)

(52) U.S. Cl.
CPC .......... *F16L 37/091* (2013.01); *F16L 37/0915* (2016.05)

(58) Field of Classification Search
USPC .......................... 285/39, 243, 307–308, 319, 321–322,285/339–340, 342, 345, 351, 921
See application file for complete search history.

(56) References Cited

U.S. PATENT DOCUMENTS

| 2,005,056 A | 6/1935 | Stephens |
| 2,201,372 A | 5/1940 | Miller |
| 2,459,251 A | 1/1949 | Stillwagon |
| 2,475,741 A | 7/1949 | Goelier |
| 2,484,192 A | 10/1949 | Squiller |
| 2,491,004 A | 12/1949 | Graham |

(Continued)

FOREIGN PATENT DOCUMENTS

| EP | 0528079 | 2/1993 |
| FR | 2394736 | 1/1979 |

(Continued)

OTHER PUBLICATIONS

Patent Cooperation Treaty Search Report and Written Opinion for PCT/US2014/069513 dated Apr. 2, 2015.

(Continued)

*Primary Examiner* — Aaron Dunwoody
*Assistant Examiner* — Fannie Kee
(74) *Attorney, Agent, or Firm* — Price Heneveld LLP

(57) ABSTRACT

A housing for receiving a fluid conduit has an internal annular shoulder. A cylindrical first cartridge is positioned in the housing and has an internal annular groove and an outer annular groove. An O-ring in the internal annular groove provides a seal with a fluid conduit. A second O-ring is positioned within the outer annular groove to provide a seal between the first cartridge and the housing. A gripping ring is positioned adjacent and in contact with the first cartridge and has inwardly projecting annularly spaced tines for gripping and holding a fluid conduit inserted into the housing. A second cylindrical cartridge is positioned adjacent the gripping ring on a side opposite the first cartridge. The housing includes a lip at one end to engage the second cartridge for holding the first and second cartridges and the gripping ring against the annular shoulder in the housing.

20 Claims, 9 Drawing Sheets

(56) References Cited

U.S. PATENT DOCUMENTS

| | | |
|---|---|---|
| 2,831,711 A | 4/1958 | Leadbetter |
| 2,950,132 A | 8/1960 | Kocsuta |
| 3,116,078 A | 12/1963 | Scherer |
| 3,204,988 A | 9/1965 | Ouderkirk et al. |
| 3,312,483 A | 4/1967 | Leadbetter et el. |
| 3,380,765 A | 4/1968 | Himmel |
| 3,409,314 A | 11/1968 | Roe |
| 3,453,006 A | 7/1969 | Levake |
| 3,477,750 A | 11/1969 | Powell |
| 3,603,619 A | 9/1971 | Bengesser et al. |
| 3,837,687 A | 9/1974 | Leonard |
| 3,874,709 A | 4/1975 | MacDonald |
| 3,884,508 A | 5/1975 | Jones |
| 3,909,046 A | 9/1975 | Legris |
| 3,915,480 A | 10/1975 | Kish et al. |
| 3,920,270 A | 11/1975 | Babb, Jr. |
| 3,924,877 A * | 12/1975 | Leopold, Jr. ......... F16L 21/022 285/340 |
| 4,043,576 A | 8/1977 | Reich et al. |
| 4,073,514 A | 2/1978 | Pate |
| 4,084,843 A * | 4/1978 | Gassert ................ F16L 37/091 285/105 |
| 4,123,090 A | 10/1978 | Kotsakis et al. |
| 4,138,146 A | 2/1979 | Rumble |
| 4,163,573 A | 8/1979 | Yano |
| 4,564,221 A | 1/1986 | Ishii |
| 4,586,734 A | 5/1986 | Grenier |
| 4,593,943 A | 6/1986 | Hama et al. |
| 4,613,172 A | 9/1986 | Schattmaier |
| 4,637,636 A | 1/1987 | Guest |
| 4,664,427 A * | 5/1987 | Johnston ............... F16L 37/092 285/270 |
| 4,747,626 A | 5/1988 | Hama et al. |
| 4,919,457 A * | 4/1990 | Moretti ............... F16L 37/0915 285/308 |
| 4,993,755 A * | 2/1991 | Johnston ............... F16L 37/133 285/315 |
| 5,029,908 A | 7/1991 | Belisaire |
| 5,039,141 A | 8/1991 | Badoureaux |
| 5,096,235 A | 3/1992 | Oetiker |
| 5,108,134 A | 4/1992 | Irwin |
| 5,160,179 A | 11/1992 | Takagi |
| 5,301,408 A | 4/1994 | Berman et al. |
| 5,328,215 A | 7/1994 | Grenier |
| 5,370,423 A | 12/1994 | Guest |
| 5,443,289 A | 8/1995 | Guest |
| 5,466,019 A | 11/1995 | Komolrochanaporn |
| 5,490,694 A | 2/1996 | Shumway |
| 5,496,073 A | 3/1996 | Grenier |
| 5,511,830 A * | 4/1996 | Olson ................ F16L 37/0925 285/243 |
| 5,553,901 A * | 9/1996 | Serot ................. F16L 37/091 285/322 |
| 5,603,530 A | 2/1997 | Guest |
| 5,673,945 A | 10/1997 | Olson |
| 5,769,462 A | 6/1998 | Angell |
| 5,813,705 A | 9/1998 | Dole |
| 5,885,450 A | 3/1999 | Reid |
| 5,911,443 A * | 6/1999 | Le Quere ............ F16L 37/0915 285/23 |
| 5,911,446 A | 6/1999 | McLennan et al. |
| 5,934,712 A | 8/1999 | Friedrich et al. |
| 6,039,361 A | 3/2000 | Meli |
| 6,056,326 A | 5/2000 | Guest |
| 6,065,779 A | 5/2000 | Moner et al. |
| 6,174,002 B1 | 1/2001 | Rho |
| 6,231,090 B1 | 5/2001 | Fukao et al. |
| 6,447,019 B1 * | 9/2002 | Hosono ............... F16L 37/0915 285/148.19 |
| 6,464,266 B1 | 10/2002 | O'Neill et al. |
| 6,488,318 B1 | 12/2002 | Shim |
| 6,517,124 B1 | 2/2003 | Le Quere |
| 6,641,178 B2 | 11/2003 | Gowing |
| 6,663,145 B1 | 12/2003 | Lyall, III et al. |
| 6,685,230 B1 | 2/2004 | Bottura |
| 6,805,385 B2 | 10/2004 | Viegener |
| 6,880,865 B2 | 4/2005 | Guest |
| RE38,786 E | 8/2005 | Guest |
| 6,929,289 B1 | 8/2005 | Guest |
| 6,957,833 B2 | 10/2005 | Guest |
| 7,032,932 B2 | 4/2006 | Guest |
| 7,063,359 B2 | 6/2006 | Vallee |
| 7,100,948 B2 | 9/2006 | Guest |
| 7,121,593 B2 | 10/2006 | Snyder, Sr. et al. |
| 7,316,429 B2 | 1/2008 | Viegener |
| 7,341,286 B2 | 3/2008 | Andre |
| 7,354,079 B2 | 4/2008 | Rehder et al. |
| 7,410,193 B2 | 8/2008 | Guest |
| 7,425,022 B2 | 9/2008 | Guest |
| 7,448,654 B2 * | 11/2008 | Le Quere ............ F16L 37/0915 285/308 |
| 7,497,483 B2 | 3/2009 | Williams et al. |
| 7,533,907 B2 | 5/2009 | Swift et al. |
| 7,621,569 B2 * | 11/2009 | Anthoine ............ F16L 37/0915 285/3 |
| 7,862,089 B2 | 1/2011 | Crompton |
| 8,205,915 B1 | 6/2012 | Crompton et al. |
| 8,210,576 B2 | 7/2012 | Crompton |
| 8,398,122 B2 | 3/2013 | Crompton et al. |
| 8,480,134 B2 | 7/2013 | Crompton et al. |
| 8,585,100 B2 | 11/2013 | Stults et al. |
| 8,608,205 B2 | 12/2013 | Lai |
| 2002/0109353 A1 | 8/2002 | Guest |
| 2003/0057701 A1 | 3/2003 | Koo |
| 2004/0070198 A1 | 4/2004 | Rohrig |
| 2007/0075542 A1 | 4/2007 | Glaze et al. |
| 2009/0278346 A1 | 11/2009 | O'Brien |
| 2010/0171302 A1 | 7/2010 | Yoder |
| 2010/0253064 A1 | 10/2010 | Le Quere |
| 2011/0088790 A1 | 4/2011 | Schutte et al. |
| 2011/0089684 A1 | 4/2011 | Schutte et al. |
| 2012/0284994 A1 * | 11/2012 | Crompton .......... F16L 37/0915 29/455.1 |
| 2015/0240980 A1 | 8/2015 | Bobo et al. |

FOREIGN PATENT DOCUMENTS

| | | |
|---|---|---|
| FR | 2689205 | 10/1993 |
| GB | 1520742 | 8/1978 |
| GB | 2167147 | 5/1988 |

OTHER PUBLICATIONS 3 pages of photographs of prior art commercial fittings Jul. 14, 2008.

\* cited by examiner

PUSH-TO-CONNECT FITTING

CROSS-REFERENCE TO RELATED APPLICATIONS

This application claims priority under 35 U.S.C. §119(e) and the benefit of U.S. Provisional Application No. 61/914,522 entitled PUSH-TO-CONNECT FITTING, filed on Dec. 11, 2013, by David Bobo et al., the entire disclosure of which is incorporated herein by reference.

BACKGROUND OF THE INVENTION

The present invention relates to a plumbing fitting which requires no crimping or soldering.

There have been numerous proposals for push-to-connect plumbing fittings which eliminate the need for additional labor steps in providing a connection of a fluid conduit to the fitting. With push-to-connect fittings, typically no soldering is necessary nor is crimping required. One proposal is disclosed in U.S. Publication 2010/0171302 published on Jul. 8, 2010. Push-to-connect fittings may require a separate tool for the removal of a fluid conduit from the fitting once assembled and, in some cases, integrally includes a release ring for such purpose. Nearly all of the push-to-connect fittings employ a gripping ring made of a metal, such as stainless steel, with tines that extend inwardly and engage and hold a fluid conduit inserted into the fitting. Also, the fittings typically include at least one O-ring providing a fluid-tight seal for the connection.

Unfortunately, most of the push-to-connect fittings are relatively complicated to manufacture and require expensive tooled parts and/or forming processes to complete. As a result, they can become fairly expensive in an environment where competition is, relatively vigorous.

SUMMARY OF THE INVENTION

A push-to-connect plumbing fitting comprising a housing for receiving a fluid conduit. The housing has an internal annular shoulder and is made of a material that allows it to be formed. A generally cylindrical first cartridge has an internal annular groove and a radially spaced outer annular groove and is positioned in the housing. An O-ring is positioned within the internal annular groove to provide a seal with a fluid conduit, and a second O-ring is positioned within the outer annular groove to provide a seal between the first cartridge and the housing. A gripping ring is positioned in the housing adjacent and in contact with the first cartridge and has inwardly projecting annularly spaced tines for gripping and holding a fluid conduit inserted into the housing past the gripping ring. A second generally cylindrical cartridge is positioned in the housing adjacent the gripping ring on a side opposite the first cartridge, wherein the housing includes a lip at one end to engage the second cartridge for holding the first and second cartridges and the gripping ring in compression against the annular shoulder in the housing.

By employing first and second O-rings on inner and outer surfaces of a cartridge, independent sizing of the O-rings is possible for individual sealing functions. Also, the spaced-apart cartridges can be integrally molded of a polymeric material and are easy to assemble, resulting in a relatively inexpensive yet effective push-to-connect fitting. In a preferred embodiment, a release ring is also provided, such that a separate tool is not necessary to disconnect a fluid conduit from the fitting.

These and other features, objects and advantages of the present invention will become apparent upon reading the following description thereof together with reference to the accompanying drawings.

DETAILED DESCRIPTION OF THE PREFERRED EMBODIMENT

Figure 1:
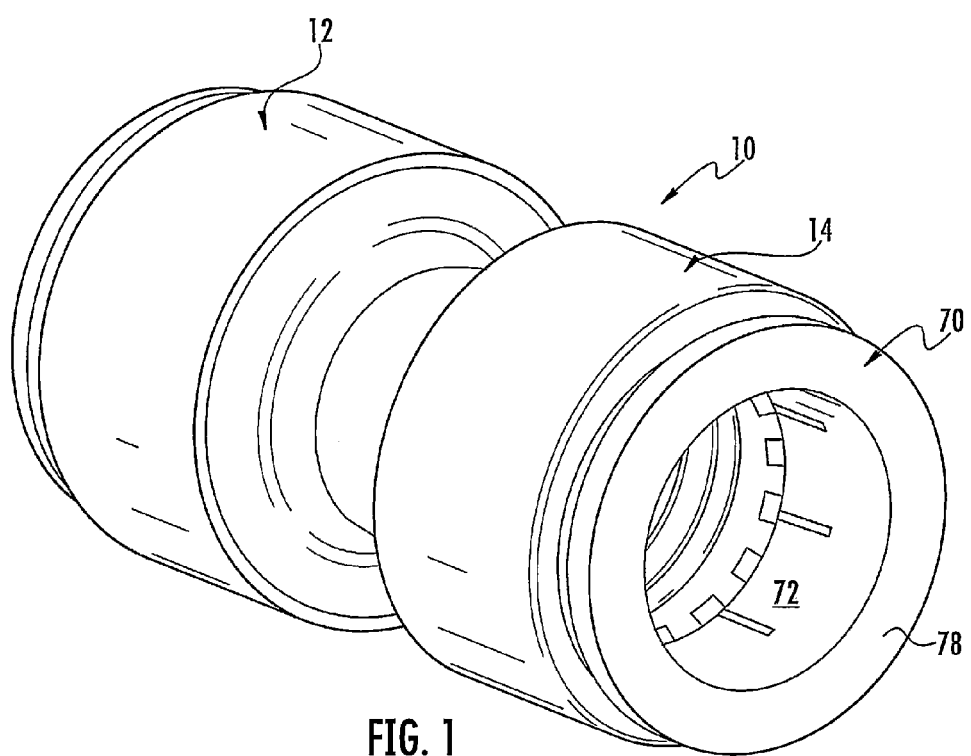
FIG. 1 is a perspective view of a plumbing fitting embodying the push-to-connect structure of this invention at opposite ends.
Figure 4:
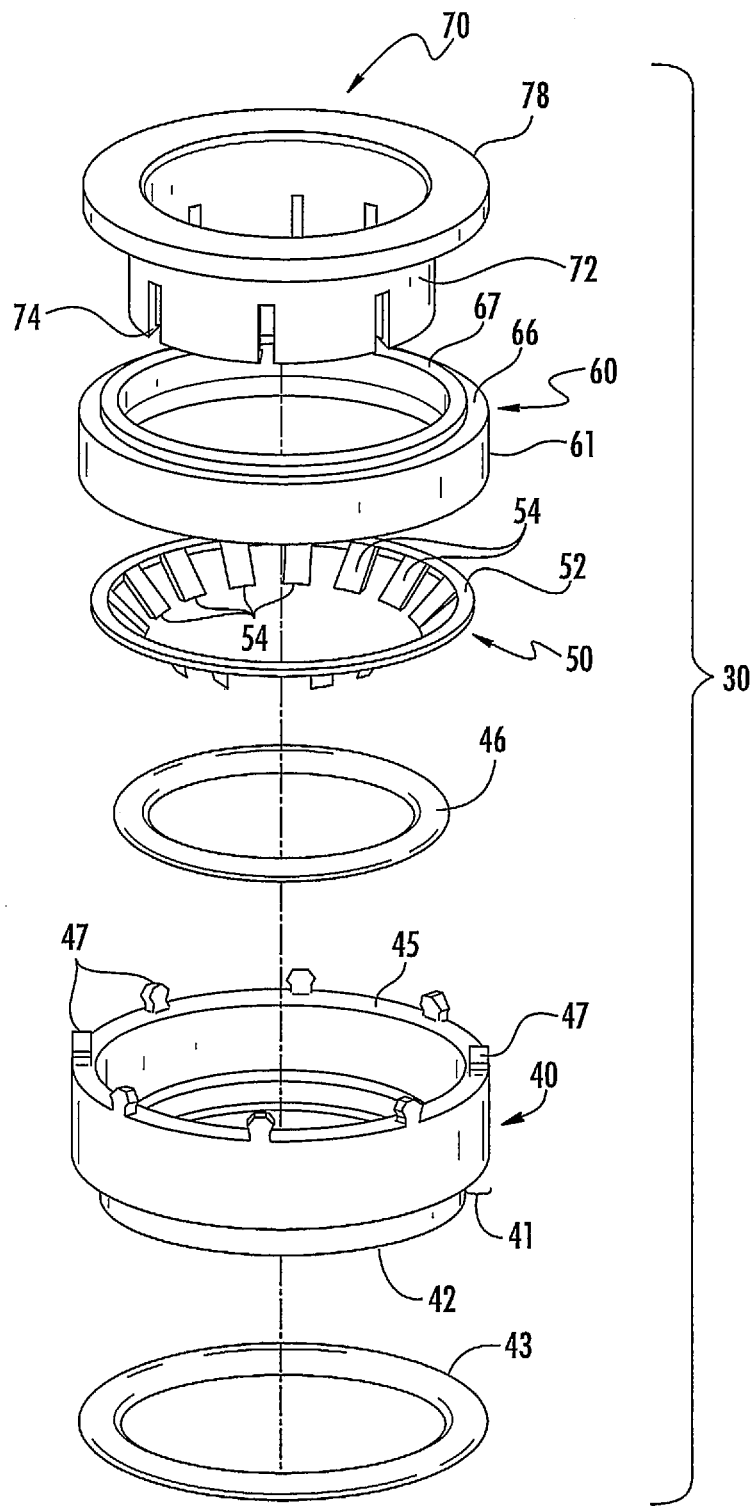
FIG. 4 is an exploded perspective view of the components of the fitting of FIG. 3.

Referring initially to FIG. 1, there is shown a plumbing fitting 10 embodying the present invention. The fitting 10 includes a push-to-connect assembly 30, 30' (FIGS. 2 and 4) at each end 12 and 14 for the in-line coupling of two fluid conduits, such as conduit 11 shown in phantom in FIG. 2. It is to be understood that the fitting 10 can take on a variety of forms, including elbows, T's, and adapters, and the push-to-connect assembly 30 can be integrally included with other plumbing fittings, such as valves and the like.

Figure 5:
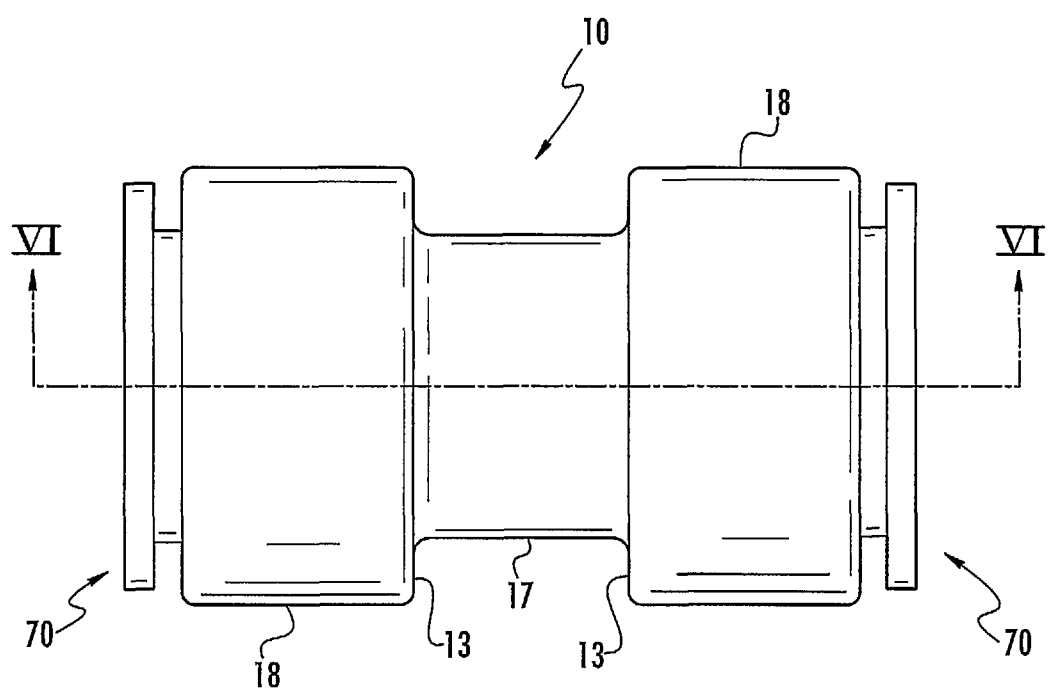
FIG. 5 is a side elevational view of the fitting.

Referring to FIGS. 2-16, the details of construction of fitting 10 is provided. Fitting 10 includes a housing 16 (FIG. 2) made of a material which can be formed to captively hold the push-to-connect assemblies 30 and 30' within opposite ends of the housing. The generally cylindrical housing 16 includes enlarged diameter outer sections 18 (FIGS. 2, 5, and 6) at each end between which is a narrower diameter section 17 having an inner annular extending rib 15 (FIGS. 2 and 6) forming a stop for the end of a fluid conduit 11 inserted therein. The enlarged outer sections 18 house the push-to-connect assemblies 30, 30' and, once positioned within sections 18 of housing 16, the outer peripheral ends of housing 16 are crimped over to define lips 19 for captively holding the push-to-connect assemblies 30, 30' between a shoulder 13 at the inner end of sections 18 and the roll-formed annular lips 19.

The housing 16 can be made of any suitable material which is capable of deforming to provide a lip 19 once the push-to-connect assemblies 30, 30' have been inserted into sections 18. Typically, the housing 16 is made of copper or a copper alloy material or other metal typically used for plumbing fittings and which is suitably ductile for such purpose.

The push-to-connect structure is identical for each of the ends 12 and 14 so that only assembly 30 is discussed in detail. The push-to-connect assembly 30 comprises a first generally cylindrical molded polymeric cartridge 40 (FIGS. 2-4 and 6-9) having a first annular surface 42 which abuts the annular shoulder 13 of housing 16. Adjacent the first surface is a ring seal seat comprising an external annular groove 41, which receives an outer O-ring 43 providing a fluid-tight seal between the inner cylindrical wall of housing 16 and the first cartridge 40. Axially spaced from the first surface 42 is a ring seal seat comprising an inner annular groove 44 (best seen in FIG. 9) for receiving an internal O-ring 46 which provides a seal between cartridge 40 and a fluid conduit (such as conduit 11 shown in phantom form in FIG. 2) when inserted into the fitting 10. The O-rings 43, 46 can be independently sized to accommodate individual sealing functions. The conduit 11 can be made of a polymeric material, a copper alloy, or any suitable fluid conduit in common use in fluid handling or plumbing systems. The end of the conduit 11 engages the inwardly projecting rib 15 of the housing 16, which serves as a stop for the insertion of the conduit. The first cartridge 40 includes an inclined or ramped outer surface 48 axially spaced from the O-ring groove 44 and facing outwardly and in remote relationship to the first surface 42.

Figure 3:
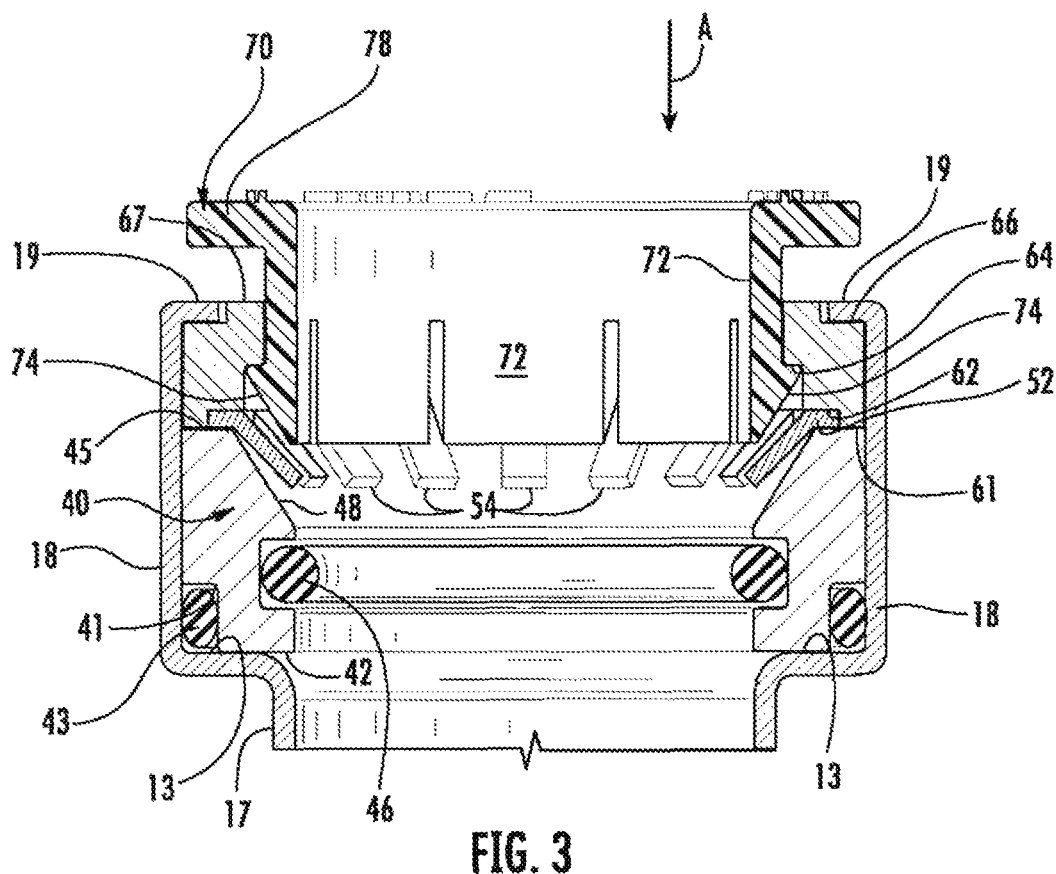
FIG. 3 is an enlarged cross-sectional view of one end of the fitting shown in FIGS. 1 and 2.
Figure 6:
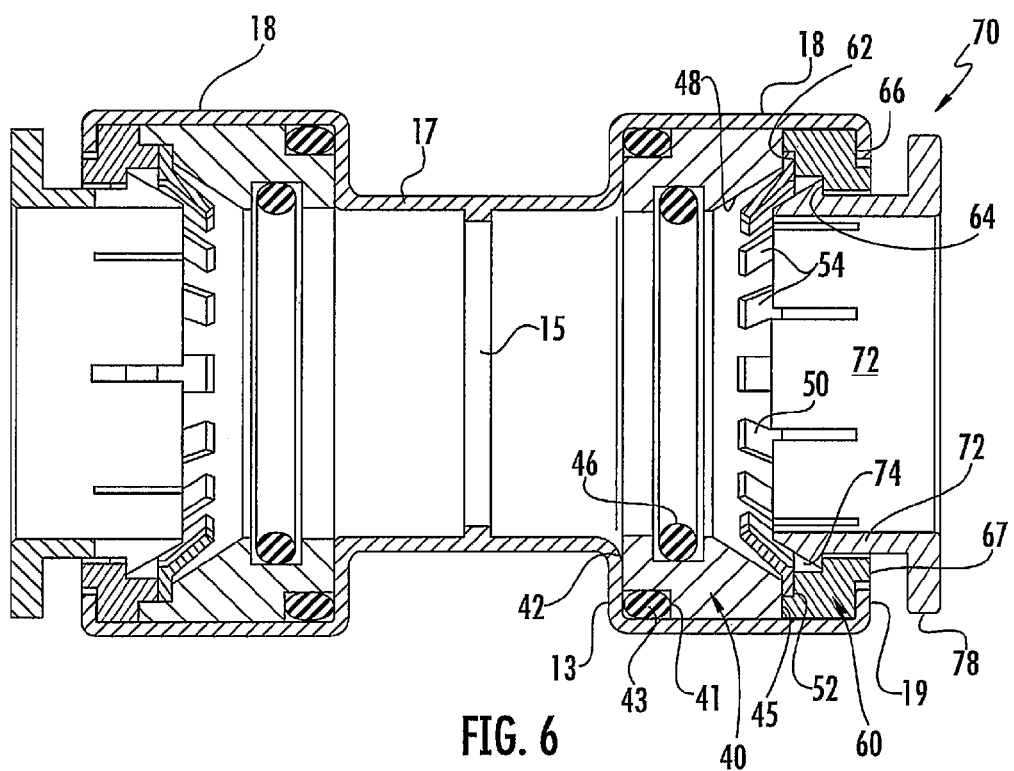
FIG. 6 is a cross-sectional view of the fitting taken along section line VI-VI of FIG. 5.
Figure 7:
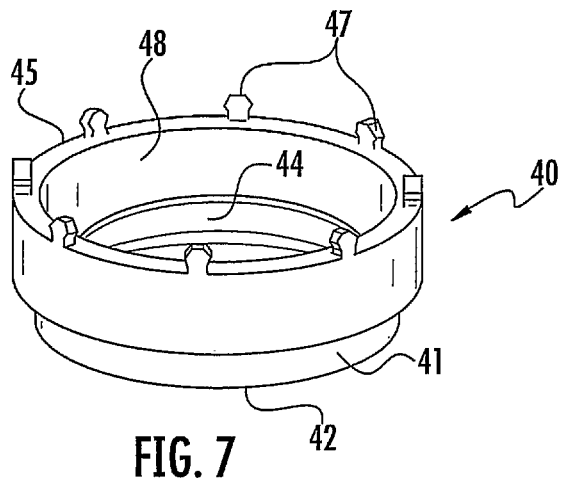
FIG. 7 is a perspective view of the first cartridge.
Figure 8:
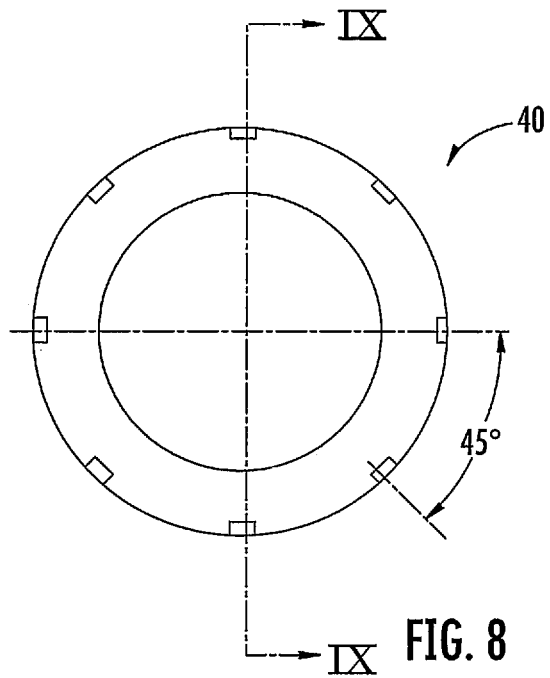
FIG. 8 is a top plan view of the cartridge shown in FIG. 7.
Figure 9:
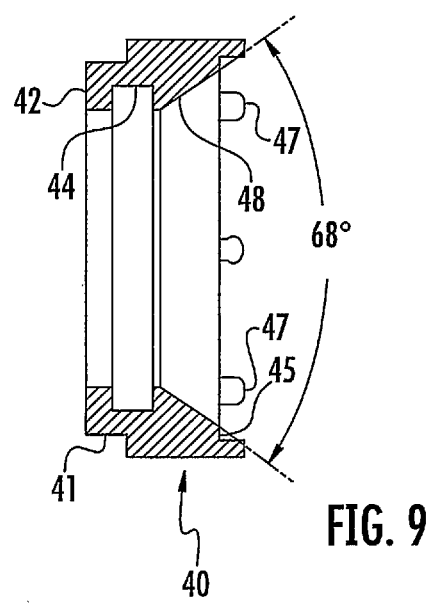
FIG. 9 is a cross-sectional view of the first cartridge taken along section lines IX-IX in FIG. 8.
Figure 10:
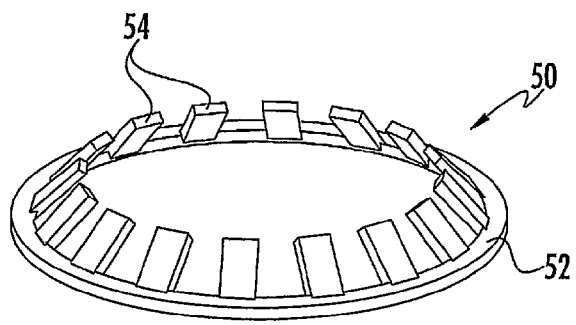
FIG. 10 is a perspective view of the gripping ring.
Figure 11:
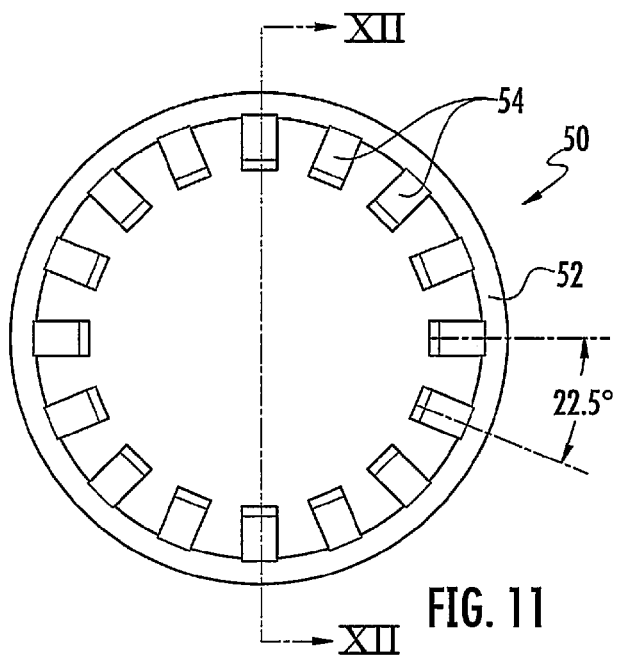
FIG. 11 is a top plan view of the gripping ring shown in FIG. 10.
Figure 12:
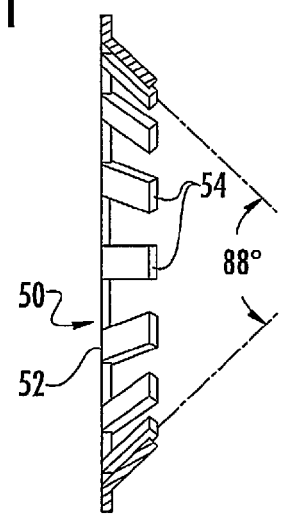
FIG. 12 is a cross-sectional view of the gripping ring taken along section lines XII-XII in FIG. 11.
Figure 13:
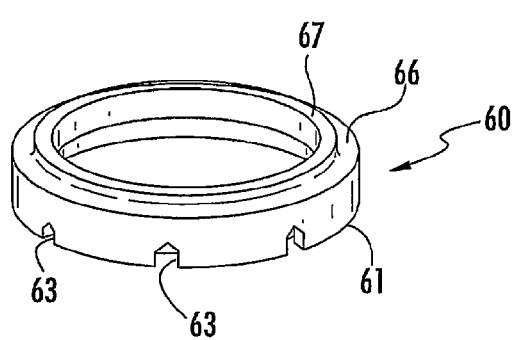
FIG. 13 is a perspective view of the second cartridge.
Figure 14:
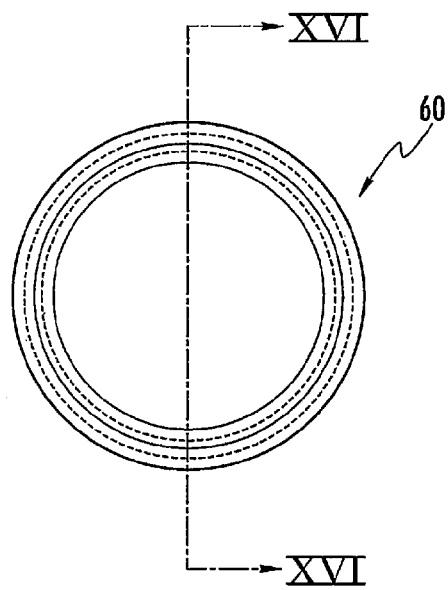
FIG. 14 is a top plan view of the second cartridge shown in FIG. 13.
Figure 15:
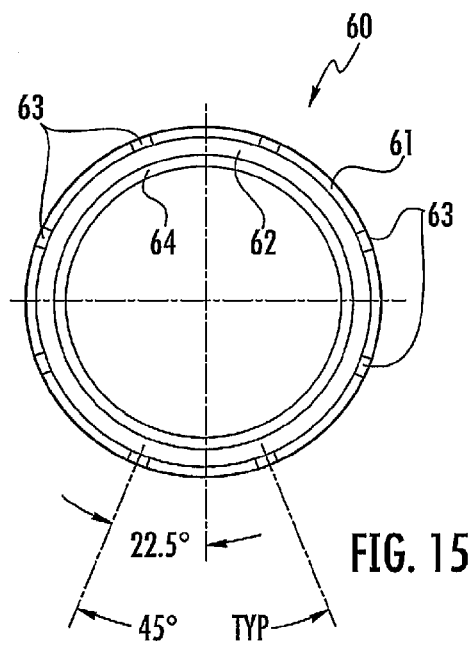
FIG. 15 is a bottom plan view of the second cartridge shown in FIGS. 13 and 14.
Figure 16:
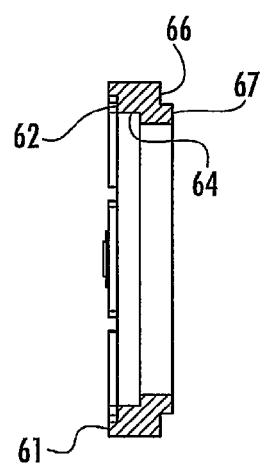
FIG. 16 is a cross-sectional view of the second cartridge taken along section line XVI-XVI in FIG. 14.

A gripping ring 50 (FIGS. 4 and 10-12) is generally circular, including a circular outer ring 52 seated against the annular surface 45 of cartridge 40, as seen in FIGS. 3 and 6. A plurality of inwardly angled, spaced-apart tines 54 extend inwardly from ring 52, as best seen in FIG. 12, and are dimensioned to grip and hold a conduit, such as conduit 11, once inserted into the fitting 10, extended through the gripping ring 50 and seated against rib 15.

Figure 2:
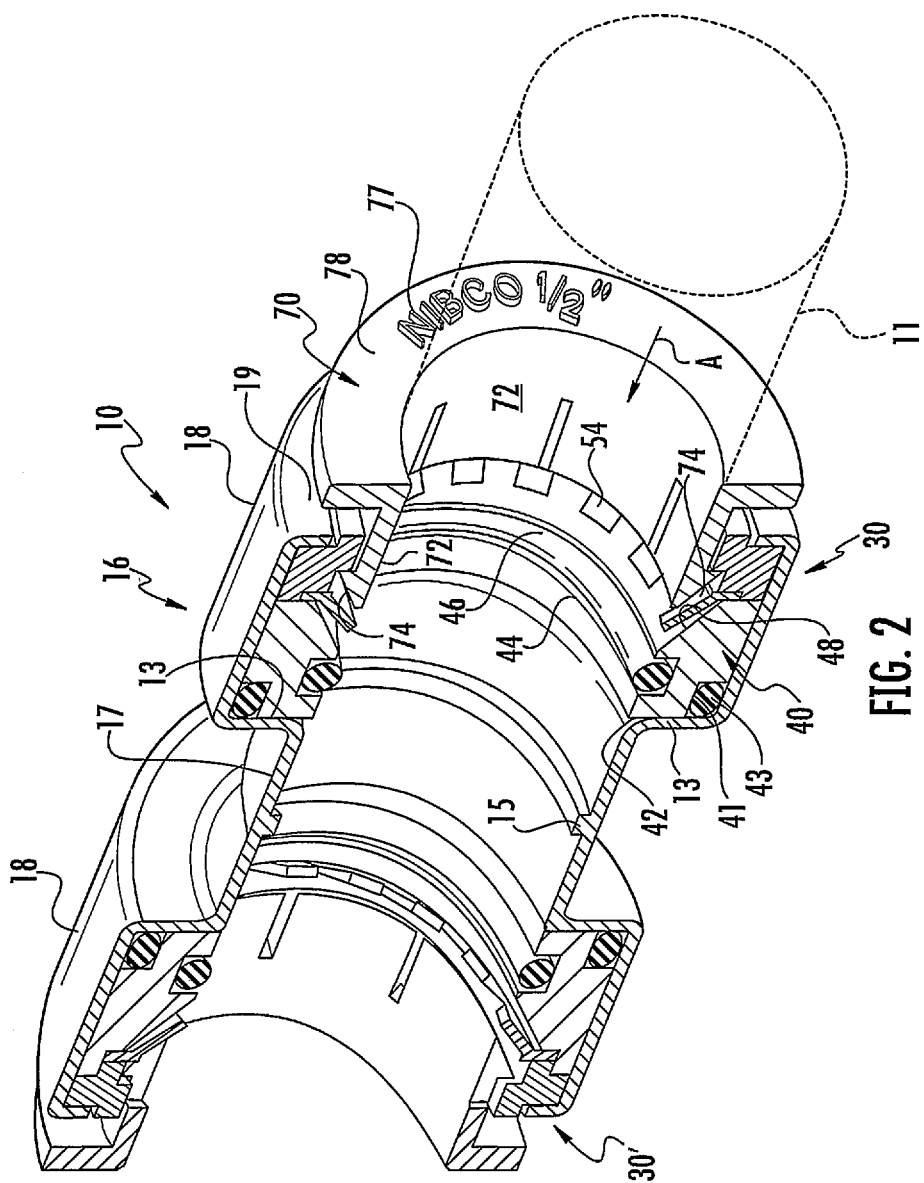
FIG. 2 is a vertical cross-sectional view of the fitting shown in FIG. 1.

The first cartridge 40 can be integrally molded of a suitable polymeric material, such as ABS, PVC, or the like. The annular surface 45 of first cartridge 40 opposite surface 42 includes a plurality of angularly spaced, upwardly projecting tabs 47 (FIGS. 4 and 7), which index with and are matingly received in slots 63 (FIGS. 13 and 15) in the second cartridge 60 to prevent rotation between the cartridges once assembled as seen in FIGS. 1, 2, and 6. The O-rings 43, 46 are made of suitable elastomeric material typically employed for fluid fittings. The gripping ring 50 is made of a noncorrosive spring steel material, such as stainless steel.

The second generally cylindrical cartridge 60 (FIGS. 13-16) likewise is integrally molded of a suitable polymeric material, such as ABS, PVC, or the like, and has an outer annular recess 62 (FIGS. 15 and 16) which receives and overlies the circular ring 52 of the gripping ring, as best seen in FIGS. 3 and 6. The second cartridge 60 also includes an outer annular rim 61 which engages annular surface 45 of cartridge 40. The rim 61 includes slots 63 (FIGS. 13 and 15) which are shaped and spaced to indexably receive the tabs 47 of cartridge 40. Cartridge 60 includes an internally formed shoulder 64 (Best seen in FIG. 16), which lockably receives locking tabs 74 of the legs 72 of the release ring 70, as also shown in FIGS. 3 and 6. The second cartridge includes an outer annular shoulder 66 over which structure, such as the lip 19 of housing 16, is formed to compressibly hold the inner and outer cartridges with the gripping ring sandwiched therebetween in place against the shoulder 13 of the housing outer section 18. Other structure, such as indentations, may serve to secure the cartridges within fitting 10. An annular extension 67 of cartridge 60 extends through lip 19, as best seen in FIGS. 2 and 3.

The release ring 70 is generally cylindrical and includes a plurality of flexible legs 72 (FIGS. 2-4) in axially spaced relationship and which has tapered locking tabs 74 at the ends with the tapered tabs 74 of legs 72 engaging the tines 54 of the gripping ring 50 when the release ring 70 is moved downwardly in a direction indicated by arrow A in FIGS. 2 and 3 to engage the gripping ring tines, spreading them outwardly to release a fluid conduit, such as conduit 11. c The release ring 70 includes an outer collar 78, which provides a working surface against which to push the release ring for releasing a fluid conduit therein. Collar 78 also provides a surface on which indicia 77 (FIG. 2) can be formed for identifying the fitting, size and manufacturer, if desired. Release ring 70 can likewise be integrally molded of a suitable polymeric material, such as ABS, PVC, or like.

By providing inner and outer O-rings 46 and 43, respectively, a sealed connection is provided between the first cartridge and the housing, as well as a fluid conduit inserted therein. The sizes of O-rings 46, 43 can be selected to optimize the sealing efficacy. Assembly 30 is manufactured by assembling the cartridges with the O-rings and gripping ring into the outer end 18 of housing and roll-forming the lip 19 to hold the assembly in position. The release ring 70 can then be optionally included and inserted into the assembly to provide a release mechanism for removing a conduit if desired. The resultant plumbing fitting 10 is relatively inexpensive but reliable fitting which provides a fluid-tight connection for a fluid conduit and can be employed in a variety of plumbing fittings. It is easy to assemble and provides a reliable leak-free fluid connection.

It will become apparent to those skilled in the art that various modifications to the preferred embodiment of the invention as described herein can be made without departing from the spirit or scope of the invention as defined by the appended claims.

The invention claimed is:
1. A push-to-connect fluid fitting comprising:
   a housing for receiving a fluid conduit, said housing having an annular shoulder at one end and a lip at an opposite end;
   a generally cylindrical first cartridge having an internal annular groove and are outer annular groove, said first cartridge positioned in said housing;
   an O-ring positioned within said internal annular groove to provide seal with a fluid conduit;
   a second O-ring positioned within said outer annular groove to provide a seal between said first cartridge and said housing;
   a gripping ring positioned in said housing adjacent and in contact with said first cartridge, said gripping ring having inwardly projecting annularly spaced tines for gripping and holding a fluid conduit inserted into said housing past said gripping ring; and
   a second generally cylindrical cartridge positioned in said housing adjacent said gripping ring on a side opposite said first cartridge, wherein said annular shoulder engages said first cartridge and said lip engages said second cartridge for holding said first and second cartridges and said gripping ring together with said first cartridge seated against said annular shoulder of said housing.

2. The fitting as defined in claim 1 wherein said outer annular groove is axially spaced from said internal annular groove.

3. The fitting as defined in claim 1 further including a generally cylindrical release ring having axially extending spaced-apart flexible legs with tapered locking tabs at the ends of said legs for engaging said gripping ring tines when said release ring is moved axially toward said gripping ring to release a fluid conduit held by said fitting.

4. The fitting as defined in claim 3 wherein said second cartridge has an internal annular shoulder remote from said gripping ring.

5. The fitting as defined in claim 4 wherein said locking tabs engage said Internal annular shoulder of said second cartridge to hold said release ring in said fitting.

6. The fitting as defined in claim 5 wherein said release ring includes an annular collar axially spaced from said locking tabs to define, a surface for moving said release ring toward said gripping ring.

7. The fitting as defined in claim 1 wherein said housing is made of a metal.

8. The fitting as defined in claim 7 wherein said metal includes copper.

9. The fitting as defined in claim 1 wherein said first cartridge includes an inclined surface facing said tines of said gripping ring.

10. The fitting as defined in claim 1 further including an inwardly extending rib formed in said housing to serve as a stop for a conduit inserted into said housing.

11. A push-to-connect fluid fitting comprising:
a housing for receiving a fluid conduit, said housing having, an annular shoulder at one end and a lip at an opposite end;
a generally cylindrical first cartridge having an internal annular groove and an outer annular groove, said first cartridge positioned in said housing;
an O-ring positioned within said internal annular groove to provide a seal with a fluid conduit;
a second O-ring positioned within said outer annular groove to provide a seal between said list cartridge and said housing;
a gripping ring positioned in said housing adjacent and in contact with said first cartridge, said gripping ring having inwardly projecting annularly spaced tines for gripping and holding a fluid conduit inserted into said housing past said gripping ring; and
a second generally cylindrical cartridge positioned in said housing adjacent said gripping ring on a side opposite said first cartridge, wherein said annular shoulder engages said first cartridge and said lip engages said second cartridge for holding said first and second cartridges and said gripping ring together with said first cartridge seated against said annular shoulder of said housing, wherein said first cartridge includes an inclined surface facing said tines of said gripping ring, and wherein said inclined surface of said first cartridge terminates in an annular end with a plurality of angularly spaced outwardly extending tabs.

12. The fitting as defined in claim 11 wherein said second cartridge includes an annular surface with angularly spaced slots which mate with said tabs of said first cartridge.

13. A push-to-connect fluid fitting comprising:
a housing for receiving a fluid conduit, said housing having an internal annular shoulder;
a generally cylindrical first polymeric cartridge having an internal ring seal seat and a radially spaced external ring seal seat, said first cartridge positioned in said housing;
an O-ring positioned within said internal ring seal seat to provide a seal with a fluid conduit;
a second O-ring positioned within said external ring seal seat to provide a seal between said first cartridge and said housing;
a gripping ring positioned in said housing adjacent and in contact with said first cartridge, said gripping ring having inwardly projecting annularly spaced tines for gripping and holding a fluid conduit inserted into said housing past said gripping ring; and
a second generally cylindrical polymeric cartridge positioned in said housing adjacent said gripping ring on a side opposite said first cartridge, and a lip engaging said second cartridge at an end opposite said first cartridge for holding said first and second cartridges and said gripping ring together with said first cartridge seated against said internal annular shoulder of said housing.

14. The fitting as defined in claim 13 further including a generally cylindrical release ring having axially extending spaced-apart flexible legs with tapered locking tabs at the ends of said legs for engaging said gripping ring tines when said release ring is moved axially toward said gripping ring to release a fluid conduit held by said fitting.

15. The fitting as defined in claim 14 wherein said second cartridge has ark internal annular shoulder remote from said gripping ring.

16. The fitting as defined in claim 15 wherein said locking tabs engage said internal annular shoulder of said second cartridge to hold said release ring in said fitting in spaced relationship to said gripping ring.

17. The fitting as defined in claim 16 wherein said release ring includes an annular collar axially spaced from said locking tabs to define a surface for moving said release ring toward said gripping ring.

18. A push-to-connect fluid fitting comprising:
a generally cylindrical housing for receiving a fluid conduit at each end, said housing having annular shoulders spaced inwardly from opposite ends;
generally cylindrical first cartridges, each having an internal annular groove and an outer annular groove, said first cartridges positioned in said opposite ends of said housing;
an O-ring positioned within said internal annular groove of each of said first cartridges to provide a seal with a fluid conduit;
a second O-ring positioned within said outer annular groove ea of said first cartridges to provide a seal between said first cartridge and said housing;
gripping rings positioned in said housing adjacent and in contact with each of said first cartridges, said gripping rings having inwardly projecting annularly spaced tines for gripping and holding fluid conduits inserted into said housing past said gripping rings; and
generally cylindrical second cartridges positioned in opposite ends of said housing adjacent said gripping rings and on a side opposite said first cartridges, wherein said housing includes lips at said opposite ends of said housing to engage said second cartridges for holding said first and second cartridges and said gripping rings together with said first cartridges seated against said annular shoulders of said housing.

19. The fitting as defined in claim 18 when in said outer annular grooves are axially spaced from said internal annular grooves.

20. The fitting as defined in claim 18 further including a generally cylindrical release ring having axially extending spaced-apart flexible legs with tapered locking tabs at the ends of said legs for engaging said tines of said gripping rings when said release ring is moved axially toward said gripping ring to release a fluid conduit held by said fitting.

* * * * *

UNITED STATES PATENT AND TRADEMARK OFFICE
CERTIFICATE OF CORRECTION

PATENT NO.        : 9,541,228 B2  
APPLICATION NO.   : 14/564271  
DATED             : January 10, 2017  
INVENTOR(S)       : Bobo et al.

Page 1 of 1

It is certified that error appears in the above-identified patent and that said Letters Patent is hereby corrected as shown below:

In the Claims

Column 4, Line 48, "are" should be --an--;

Column 4, Line 51, after "provide" insert --a--;

Column 5, Line 14, "Internal" should be --internal--;

Column 5, Line 19, delete "," after --define--;

Column 5, Line 34, delete "," after --having--;

Column 5, Line 42, "list" should be --first--;

Column 6, Line 30, "ark" should be --an--; and

Column 6, Line 53, "groove ea of" should be --groove of each of--.

Signed and Sealed this  
Eleventh Day of April, 2017

Michelle K. Lee  
*Director of the United States Patent and Trademark Office*